United States Patent [19]

Kitzmiller et al.

[11] Patent Number: 4,655,467
[45] Date of Patent: Apr. 7, 1987

[54] STEERABLE TORSION AXLE

[75] Inventors: James A. Kitzmiller, New Bremen; Kevin D. Sell, Wapakoneta, both of Ohio

[73] Assignee: Airstream, Inc., Jackson Center, Ohio

[21] Appl. No.: 713,699

[22] Filed: Mar. 19, 1985

[51] Int. Cl.$^4$ .............................................. B60G 11/22
[52] U.S. Cl. ................................... 280/81 B; 280/716
[58] Field of Search ............... 280/695, 687, 671, 716, 280/717, 81 B

[56] References Cited

U.S. PATENT DOCUMENTS

| | | | |
|---|---|---|---|
| 2,166,774 | 7/1939 | Tjaarda | 280/691 |
| 2,371,864 | 3/1945 | Woolson et al. | 280/96.2 |
| 2,383,101 | 8/1945 | Woolson et al. | 267/21 |
| 2,409,501 | 10/1946 | Krotz | 267/21 |
| 2,457,397 | 12/1948 | Richards | 280/716 |
| 3,430,975 | 3/1969 | Wolf | 280/103 |
| 3,436,069 | 4/1969 | Henschen | 280/716 |
| 4,405,147 | 9/1983 | Horsman et al. | 280/443 |

FOREIGN PATENT DOCUMENTS

| | | | |
|---|---|---|---|
| 567492 | 2/1945 | United Kingdom | 280/716 |
| 815608 | 7/1959 | United Kingdom | 280/717 |

Primary Examiner—John J. Love
Assistant Examiner—Ross Weaver
Attorney, Agent, or Firm—Killworth, Gottman, Hagan & Schaeff

[57] ABSTRACT

A steerable torsion axle assembly adaptable as a unit to diverse vehicles includes a torsion axle tube member carrying mounting brackets attachable to the main frame of a vehicle. Independently sprung swingable torsion arms secured to square shafts within the tube member carry steerable wheel spindles equipped with steering arms interconnected by a steering linkage which includes a swingable drawbar and a draft tongue. Direct precision steering is enabled in conjunction with a soft quiet ride.

5 Claims, 5 Drawing Figures

STEERABLE TORSION AXLE

BACKGROUND OF THE INVENTION

The objective of the present invention is to provide steering capability for a torsion axle assembly of the type disclosed in U.S. Pat. No. 3,436,069, issued to C. W. Henschen on Apr. 1, 1969.

More particularly, it is an objective of the invention to provide a steerable torsion axle assembly of very durable construction which will provide an extremely smooth ride, particularly in wagon-type vehicles.

A further object of the invention is to provide a steerable torsion axle assembly having mounting brackets which can be located so as to be compatible with most standard vehicle frame widths and sizes.

Among the benefits derived from the present invention are ease of mounting of the torsion axle assembly to the wagon or other vehicle unit, and the use of elastic rubber-like cushioning elements in the torsion axle to achieve a smooth quiet ride. The torsion axle tubular beam provides an additional cross member on the vehicle to which the invention is applied to increase overall strength. Usually only four bolts are required for securely attaching the steerable torsion axle assembly to the frame of a wagon or the like. The customer has a choice of top mounting or side mounting attachment brackets with the steerable axle assembly. The low profile bracket helps to reduce the frame height of the vehicle.

Other features and advantages of the invention will become apparent to those skilled in the art during the course of the following detailed description.

DETAILED DESCRIPTION

Figure 1:
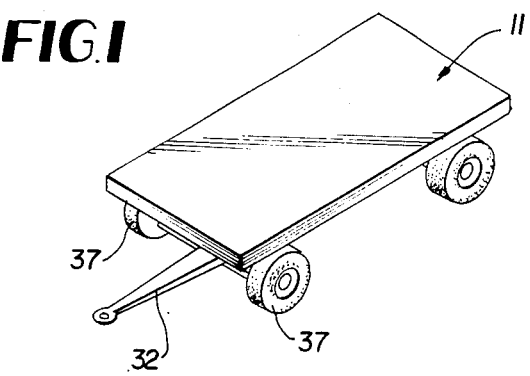
FIG. 1 is a perspective view of a wagon equipped with a steerable torsion axle in accordance with the present invention.

Referring to the drawings in detail wherein like numerals designate like parts, a torsion axle assembly in accordance with U.S. Pat. No. 3,436,069 comprises a rigid approximately square cross section tube member 10 of required length, dependent upon the width of the main frame of the vehicle on which the steerable axle assembly is being installed, such as the wagon-type vehicle 11 shown in FIG. 1.

Figure 5:
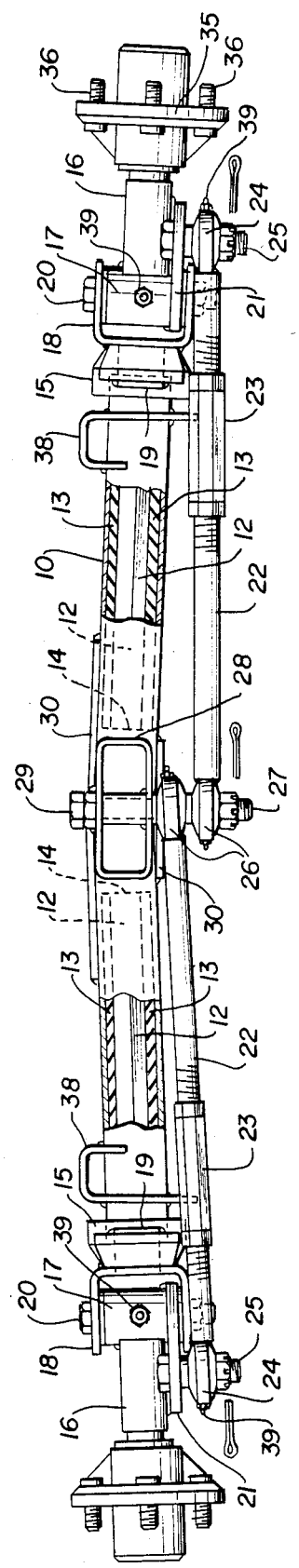
FIG. 5 is a front elevation of the steerable torsion axle assembly.

The tube member 10 receives through each of its open ends a square solid shaft 12 surrounded on its four flat faces by a corresponding number of compressible elastic rod-like cushioning elements 13 which preferably are coextensive lengthwise with the square shaft 12 and have their inner ends terminating with the corresponding ends of the square shaft 12 near the center of tube member 10, as indicated at 14 in FIG. 5.

Figure 4:
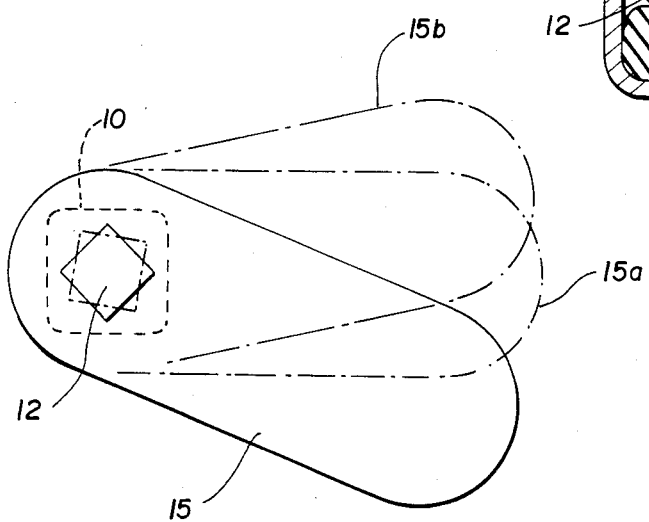
FIG. 4 is an enlarged side elevation of a torsion arm illustrating a range of movement thereof between a no-load position and an extreme shock position.

The outer ends of the two square shafts 12 are securely anchored as by welding in square openings formed in the rear ends of a pair of vertically swingable crank or torsion arms 15 which can rotate upwardly or downwardly during operation of the axle assembly within the approximate limits of rotation shown in FIG. 4. In this figure, a no-load position of the arms 15 is shown in full lines, while normal load and extreme shock load positions of the arms 15 are shown in broken lines at 15a and 15b. In accordance with U.S. Pat. No. 3,436,069, rotation of either arm 15 relative to the tube member 10 is resisted by compression of the associated elastic rubber-like cushioning elements 13. Since there are two square shafts 12, each surrounded by four of the cushioning elements 13, it will be seen that the arms 15 and all parts carried thereby are independently sprung or suspended.

In accordance with the present invention, a pair of wheel spindles 16 are rigidly secured as by welding to spindle pivot blocks 17 disposed within U-shaped pivot yokes 18 which are secured by welding to outer sides of arms 15 near their lower ends. The yokes include anchor slugs 19 which penetrate arms 15, as shown in the drawings. The spindle pivot blocks 17 are held for rotation in the yokes 18 by king pins 20.

A pair of steering arms 21 securely welded to the pivot blocks 17 and spindles 16 project forwardly of the yokes 18 and spindles and are swingable in a horizontal plane under control of a steering linkage, to be described. This steering linkage includes tie rod assemblies 22, each having a length adjusting turnbuckle 23 connected therein. The outer ends of tie rod assemblies 22 are connected through ball swivels 24 including bolts 25 with the two steering arms 21.

The interior ends of tie rod assemblies 22 are connected through a pair of stacked ball swivels 26 and a vertical axis bolt 27 with a drawbar 28 having its rear end pivotally attached through another vertical axis bolt 29 with top and bottom gusset plates 30. The gusset plates 30 are welded securely to the top and bottom walls of tube member 10, as shown. The drawbar 28 on its top surface carries a rearwardly tapering drawbar stop lug 31 which limits rotation in two directions of the drawbar around the axis of bolt 29, thereby preventing possible damage to the steering linkage caused by oversteering in either direction.

Figure 2:
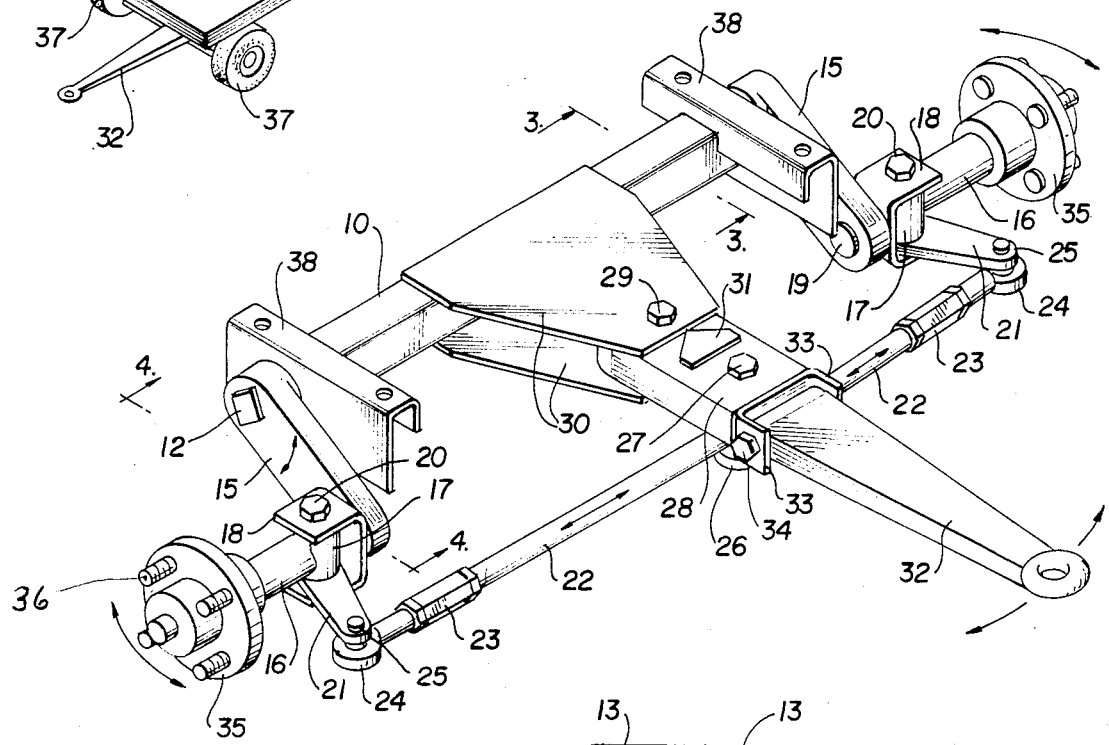
FIG. 2 is a perspective view of a steerable torsion axle assembly according to the invention.
Figure 3:
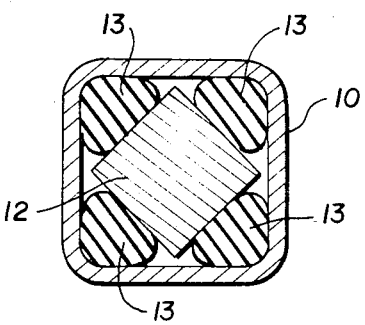
FIG. 3 is an enlarged vertical section taken on line 3—3 of FIG. 2.

A draft tongue 32 is coupled between a pair of forward lugs 33 on the drawbar 28 by a horizontal axis pivot bolt 34, FIG. 2. This enables the tongue 32 to swing vertically on the axis of bolt 34 and horizontally with the drawbar 28 on the axis of bolt 29 to effect steering.

Wheel hubs 35 carrying studs 36 are secured to the spindles 16 in a conventional manner and serve to mount the vehicle front steering wheels 37, FIG. 1. Low profile channel-like mounting brackets 38 are welded to the tube member 10 near its ends and near and inwardly of the torsion arms 15. These mounting brackets are elongated in the front-to-rear direction and are parallel. They extend a small distance only above the top of axle tube member 10. The brackets 38 are attached directly to the main frame members of a vehicle by means of four bolts, not shown. In some cases, as previously stated, side mounting brackets can be provided on the tube member 10 instead of top mounting brackets as illustrated. An even lower profile mounting bracket, not shown, substantially flush with the top face of square tube member 10, is available on request, to reduce the frame height of the vehicle equipped with the steerable torsion axle assembly.

All pivoting points in the assembly are equipped with grease fittings 39, FIG. 5. The steerable torsion axle assembly constitutes a self-contained unit having the capability to adapt to a variety of weight capacities, vehicle frame mounting widths, and hub face to hub face widths. The steering mechanism is uniquely integrated with the torsion axle of U.S. Pat. No. 3,436,069. The vehicle wheels 37 are completely independently suspended through the arms or cranks 15 from the torsion axle shafts 12.

The many advantages of the invention over the known prior art should now be readily apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A steerable torsion axle comprising a torsion axle assembly having a torsion axle tube member and mounting brackets on the tube member near its opposite ends, torsion shafts and coacting resistance elements disposed within opposite end portions of the tube member. vertically swingable torsion arms secured to said shafts substantially at the ends of the tube member and outwardly of said mounting brackets, steerable wheel spindles on said torsion arms including horizontally swingable steering arms, and a steering linkage means interconnecting the steering arms, said steering linkage means comprising tie rods connected by means of ball swivels to said steering arms, gusset plate means fixed to said torsion axle tube member near the center therof and extending forwardly thereof, a drawbar having a pivotal connection with the tie rods and another pivotal connection with said torsion axle tube member, said another pivotal connection comprising a vertical axis pivot element connecting the rear end of said drawbar with the forward end portion of said gusset plate means, an oversteering prevention stop element on said drawbar having rearwardly converging edges adapted to engage a frontal transverse edge of said gusset plate means, and a draft tongue connected with said drawbar and extending forwardly of the drawbar and said tie rods.

2. A steerable torsion axle as defined in claim 1, and said steerable wheel spindles including pivot blocks at their inner ends fixed to said steering arms, yokes containing said pivot blocks and being fixed to the torsion arms, and vertical axis king pins extending through the yokes, pivot blocks and steering arms.

3. A steerable torsion axle as defined in claim 1, and said tube member comprising a rectangular tube, and said mounting brackets comprising front-to-back elongated apertured brackets fixed directly to the tube member near its ends and having top faces projecting a small distance only above the top face of said tube member.

4. A steerable torsion axle as defined in claim 1, and said draft tongue having its rear end pivotally attached to the drawbar by a transverse axis pivotal element disposed near and forwardly of said tie rods.

5. A steerable torsion axle as defined in claim 2, and said yokes being U-shaped and including vertical webs fixed by welding to the torsion arms and having open sides away from the torsion arms and top and bottom parallel webs receiving the vertical axis king pins therethrough, said pivot blocks being disposed between the top and bottom webs of said yokes.

* * * * *